(12) United States Patent  
Gardner et al.

(10) Patent No.: US 10,217,996 B2  
(45) Date of Patent: Feb. 26, 2019

(54) PARTICLE-BASED SILICON ELECTRODES FOR ENERGY STORAGE DEVICES

(71) Applicant: Intel Corporation, Santa Clara, CA (US)

(72) Inventors: Donald S. Gardner, Los Altos, CA (US); Charles W. Holzwarth, San Jose, CA (US); Bum Ki Moon, Gilroy, CA (US); Yang Liu, Santa Clara, CA (US); Priyanka Pande, Ann Arbor, MI (US); Shanthi Murali, Santa Clara, CA (US); Nicolas Cirigliano, Burlingame, CA (US); Zhaohui Chen, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/340,750

(22) Filed: Nov. 1, 2016

(65) Prior Publication Data

US 2017/0155131 A1    Jun. 1, 2017

Related U.S. Application Data

(63) Continuation of application No. 13/931,157, filed on Jun. 28, 2013, now Pat. No. 9,484,576.

(51) Int. Cl.
*H01M 4/36* (2006.01)
*H01M 4/38* (2006.01)
(Continued)

(52) U.S. Cl.
CPC ............. *H01M 4/366* (2013.01); *H01M 4/38* (2013.01); *H01M 4/386* (2013.01); *H01M 4/387* (2013.01); *H01M 4/483* (2013.01); *H01M 4/485* (2013.01); *H01M 4/587* (2013.01); *H01M 4/62* (2013.01); *H01M 2004/021* (2013.01); *H01M 2004/027* (2013.01); *Y02E 60/122* (2013.01); *Y02P 70/54* (2015.11); *Y10T 29/49108* (2015.01); *Y10T 29/49115* (2015.01)

(58) Field of Classification Search
None
See application file for complete search history.

(56) References Cited

U.S. PATENT DOCUMENTS

| | | |
|---|---|---|
| 2005/0031958 A1 | 2/2005 | Fukuoka et al. |
| 2010/0163791 A1 | 7/2010 | Fukui et al. |

FOREIGN PATENT DOCUMENTS

| | | |
|---|---|---|
| WO | WO 2011/123135 A1 | 10/2011 |
| WO | WO 2012/028857 A1 | 3/2012 |

OTHER PUBLICATIONS

C. K. Chan, R. N. Patel, M. O'Connell, B. Korgel, Y. Cui, ACS Nano 2010, 4, 1443.

(Continued)

*Primary Examiner* — Wyatt P McConnell
(74) *Attorney, Agent, or Firm* — Thorpe North and Western, LLP; David W. Osborne

(57) ABSTRACT

Electrodes, energy storage devices using such electrodes, and associated methods are disclosed. In an example, an electrode for use in an energy storage device can comprise porous disks comprising a porous material, the porous disks having a plurality of channels and a surface, the plurality of channels opening to the surface; and a structural material encapsulating the porous disks; where the structural material provides structural stability to the electrode during use.

27 Claims, 6 Drawing Sheets

(51) Int. Cl.
　　　*H01M 4/485*　　(2010.01)
　　　*H01M 4/587*　　(2010.01)
　　　*H01M 4/62*　　(2006.01)
　　　*H01M 4/48*　　(2010.01)
　　　*H01M 4/02*　　(2006.01)

(56) References Cited

OTHER PUBLICATIONS

Chen, X.; Gerasopoulos, K.; Guo, J.; Brown, A.; Wang, C.; Ghodssi, R.; Culver, J. N. ACS Nano 2010, 4, 5366.
Green, M.; Fielder, E.; Scrosati, B.; Wachtler, M.; Moreno, J. S. Electrochem. Solid-State Lett. 2003, 6, A75.
H. Kim, B, Han, J. Choo, J. Cho, Angew. Chem. Int. Ed. 2008, 47, 10151-10154.
H. Li,X. Huang, L. Chen, Z. Wu, Y. Liang, Electrochem. Solid-State Lett. 1999, 2, 547.
Hieu, N. S.; Lim, J. C.; Lee, J. K. Microelectron. Eng. 2012, 89, 138.
J. Graetz, C.C. Ahn, R. Yazami, B. Fultz, Electrochem. Solid-State Lett. 2003, 6, A194.
Xiao, et.al., J. Electrochemical Soc., 157 (10), A1047-A1051, 2010.
Kang, D. Shin, Y Lee, K Kim, Electrochemical Soc. Prime abstract #906, 2012.
Madhuri Thakur, et. al., Chemistry of Materials, to be published, Aug. 2012.

PARTICLE-BASED SILICON ELECTRODES FOR ENERGY STORAGE DEVICES

PRIORITY DATA

This application is a continuation of U.S. patent application Ser. No. 13/931,157, filed Jun. 28, 2013, now issued as U.S. Pat. No. 9,484,576, which is incorporated herein by reference

TECHNICAL FIELD

Embodiments described herein relate generally to energy storage devices, and relate more particularly to batteries and capacitors.

BACKGROUND

Energy storage devices, including batteries and capacitors, are used in electronic devices. In particular, batteries of various types are frequently used in vehicles, grid storage, and portable or mobile devices as well as many others. Other electronic devices may depend on batteries for power, either entirely, or at least as a backup power source. While some batteries can provide significant power to devices, current batteries could be more widely used if their performance characteristics, such as duration of effective power, charge time, and overall lifespan could be improved.

Porous materials, such as porous carbon and silicon have been considered for use as electrode substrates in energy storage devices due to their ability to provide large surface areas. These materials can hold charge carriers such as lithium. Certain conductive materials could be desirable for use with such porous substrates. However, in many cases the addition of a selected material to the substrate in order to achieve certain advantages may also present a number of disadvantages. For example, some materials such as lithium may provide high specific charge capacities and energy densities, but may cause instability of the substrate. As such, research efforts into energy storage devices and related materials continue.

BRIEF DESCRIPTION OF THE DRAWINGS

Disclosed embodiments will be apparent from the detailed description which follows, taken in conjunction with the accompanying drawings, which together illustrate, by way of example, various invention features; and, wherein.

Figure 1:
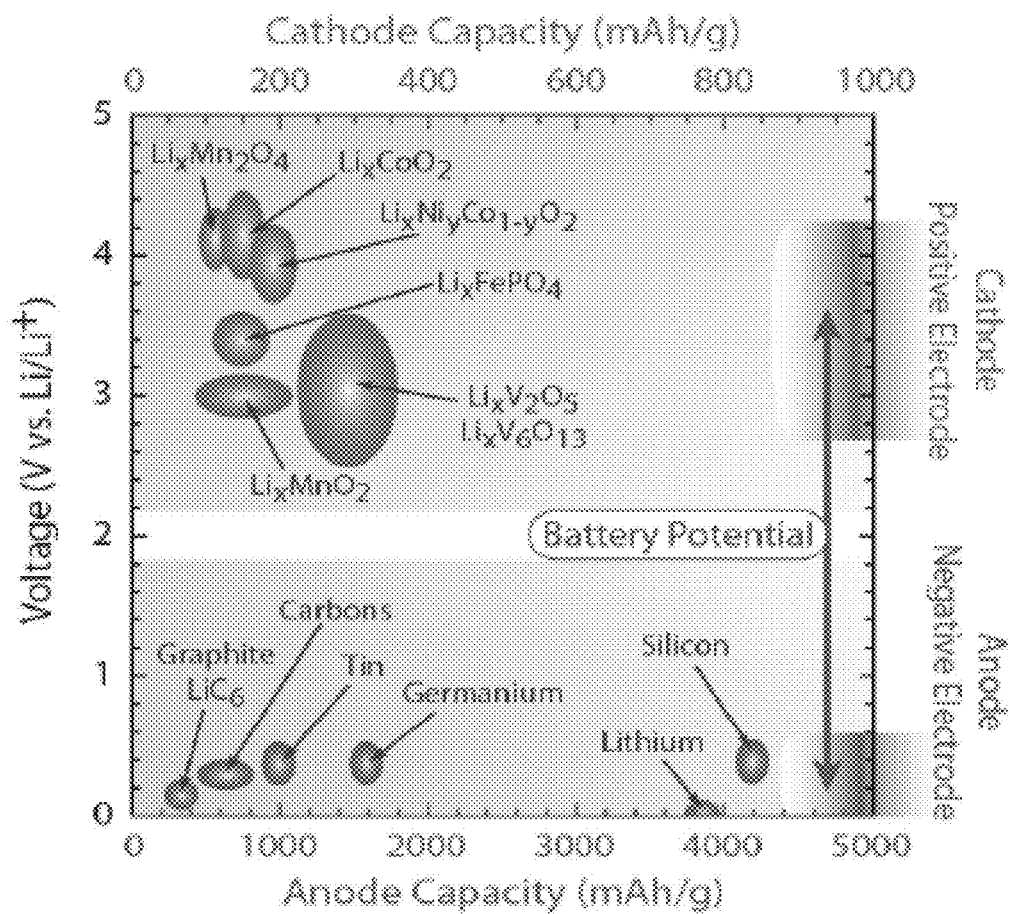
FIG. 1 is a plot of voltage vs. anode and cathode capacity for various systems in accordance with embodiments of the invention.

Reference will now be made to the exemplary embodiments illustrated, and specific language will be used herein to describe the same. It will nevertheless be understood that no limitation to the scope of invention or to specific embodiments is thereby intended.

DESCRIPTION OF EMBODIMENTS

Although the following detailed description contains many specifics for the purpose of illustration, a person of ordinary skill in the art will appreciate that many variations and alterations to the following details can be made and are considered to be included herein.

Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a structural material" includes a plurality of such materials.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and includes only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term, like "comprising" or "including," it is understood that direct support should be afforded also to "consisting essentially of" language as well as "consisting of" language as if stated explicitly.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "particle" or "particles" refers to any discrete bits, segments, masses, or portions of a material, including a porous material, without regard to size, shape, or distance from one another. For example, particles of porous material can be any size required to carry out the methods and intent of any specific invention embodiments, or to attain a specifically desired result.

Particles may take many shapes or forms as described herein as well as reasonably useful shapes not expressly recited, including shapes of specific geometry. For example, disk shaped, rectangular, rounded, spherical, elongated, cuboidal, irregular, regular, random, rhomboidal, flat, planar, curved, or other shapes may be used. In one specific embodiment, the particles may be disk shaped or "disks". While this term may be used in specific embodiments exemplified herein, it is to be understood that particles having other shapes can be substituted therefore and such examples are not limited solely to particles that are disk shaped.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous.

As used herein, "structural material" refers to a material that can be deposited within the channels, openings, or pores of a porous substrate or that can be used to encapsulate porous disks, particles, segments or pieces of the substrate in order to provide structural support for an electrode. In some aspects, such a material may allow for diffusion of an ion from an ion containing electrolyte to the porous material and provide structural support in the event of an expansion or contraction of the porous material upon interacting with the ion. In another aspect, the structural material may be chemically active and participate in the charge storage, although at a lower capacity density than the porous material. In other aspects, the structural material may have a higher diffusion rate with respect to the ion than does the porous material. In one example, the structural material can be a material that has a higher diffusion rate with lithium than the diffusion rate of lithium with porous silicon.

As used herein, "electrolyte" and "ion containing electrolyte" may be used interchangeably and include solid electrolytes, gel electrolytes, and liquid electrolyte solutions unless otherwise specified.

As used herein, "substantial" and "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context. Similarly, "substantially free of" or the like refers to the lack of an identified element or agent in a composition. Particularly, elements that are identified as being "substantially free of" are either completely absent from the composition, or are included only in amounts which are small enough so as to have no measurable effect on the composition.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Example Embodiments

An initial overview of technology embodiments is provided below and specific technology embodiments are then described in further detail. This initial summary is intended to aid readers in understanding the technology more quickly but is not intended to identify key or essential features of the technology, nor is it intended to limit the scope of the claimed subject matter.

It has been recognized that energy storage devices, e.g. rechargeable batteries, using traditional materials can have various limitations or disadvantages such as low energy densities, low charge capacities, low power density, low structural integrity, safety issues and toxicity. For example, lithium batteries with metallic lithium anodes pose safety issues. As a result, lithium-ion batteries were developed in which both electrodes are made of a material containing lithium ions. Lithium-ion batteries using carbon anodes have become widespread because the energy density of lithium-ion is typically twice that of the standard nickel-cadmium. The load characteristics are reasonably good and behave similarly to nickel-cadmium in terms of discharge. Various electrode systems are shown in FIG. 1 having cathode capacities ranging from about 100 to about 400 mA h/g and anode capacities ranging from about 300 to about 4000 mA h/g. As such, there is still potential for lithium-ion batteries to achieve even higher energy densities. When silicon is used as an anode, the charge storage capacity can be increased 10 times over that of carbon. For example, a high charge capacity for the anode, (i.e. up to 4,200 mA h/g, or up to 2,000 mA h/g if intercalated lithium ions are factored in when the battery is fully charged) can be attained. However, the lithium/silicon combination often suffers from high volume increase, which can lead to disintegration of the active material upon cycling. Thus, longevity becomes problematic.

Embodiments of the present disclosure provide energy storage devices having stabilized electrodes and result in benefits previously unachieved. Additionally, embodiments of the disclosure are capable of significantly increasing the performance characteristics of energy storage devices by providing for improved energy density, longevity, and power output, among other things. Such benefits may be achieved, at least in part, by creating an electrode comprising a porous material embedded in a structural material. In some aspects, an ion can have a higher diffusion rate in the structural material than in the porous material. Such properties can allow the electrode to achieve high charging rates while still providing structural support during cycling. In other aspects, the anion can also be stored in the structural materials and the porous materials. Exemplary electrodes and energy storage devices are discussed in detail below.

Accordingly, in various embodiments, an electrode for use in an energy storage device can comprise porous particles or "bits" e.g. disks, comprising a porous material, the porous disks having a plurality of channels and a surface, the plurality of channels opening to the surface and a structural material encapsulating, or substantially encapsulating the porous disks. Generally, the structural material provides structural stability to the electrode during use. The structural material also maintains ionic and electronic conduction between porous particles, electrolyte, and current collectors during particle volume expansion and contraction that can occur during charging and discharging.

In other embodiments, energy storage devices can utilize the electrodes described herein with an electrolyte. Similarly, yet other embodiments provide various specific pairings of electrolyte, porous material, and structural material. Such embodiments can achieve stable, high capacity electrodes.

In yet other embodiments, an energy storage device can comprise a first electrode including porous particles from a porous material, e.g. porous silicon, and an ion containing electrolyte. The porous particles can have a plurality of channels and a surface, where the plurality of channels opens to the surface. In some embodiments, the porous particles are embedded in a structural material thereby providing a structurally-reinforced electrode. The ion can have a higher diffusion rate in the structural material than in the porous material.

Figure 2:
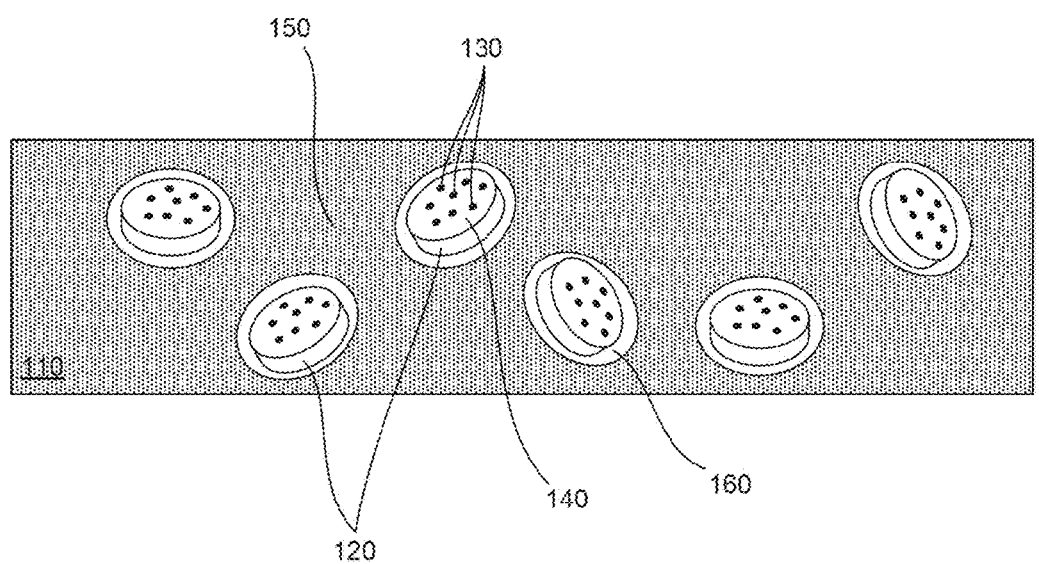
FIG. 2 is a cross-sectional view of an electrode in accordance with embodiments of the invention.
Figure 3A:
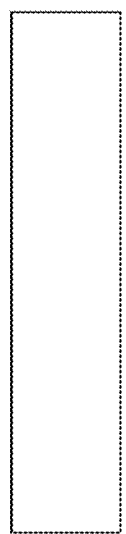
FIGS. 3A-3H illustrate different pore shapes in accordance with embodiments of the invention.
Figure 3B:
Figure 3C:
Figure 3D:
Figure 3E:
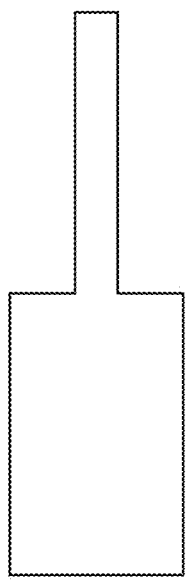
Figure 3F:
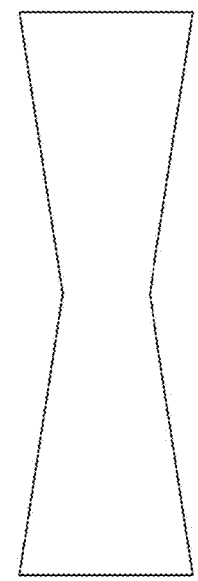
Figure 3G:
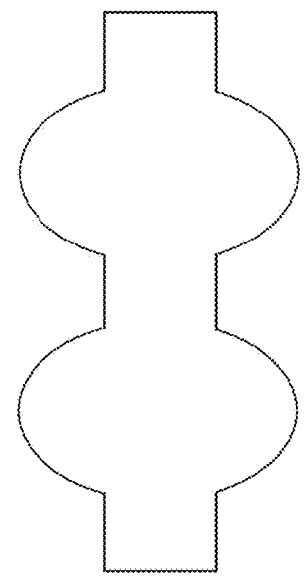
Figure 3H:
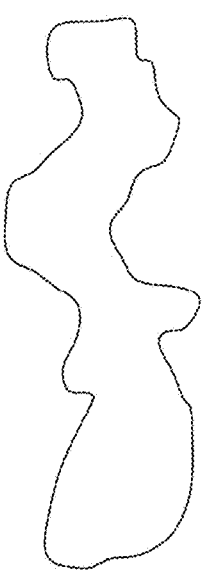

Referring to FIG. 2, an electrode 110 can comprise a plurality of porous particles 120 (exemplified as disks or disk shaped particles) where each particle has a plurality of channels 130 opening to the surface 140 of the porous particle. The porous particles can be embedded in a structural material 150. The electrode can include a void volume or porosity that allows for expansion of the porous material when the porous material is intercalated with ions such as lithium. The void volume accounts for the void space 160 around the embedded disks as well as the porosity of the particles. Additionally, in one embodiment, the electrode can include an electrolyte containing ions as discussed herein. It is noted, that while not specifically shown, in some embodiments, some or all of the porous particles 120 may be in direct contact with the structural material 150 and not entirely or partially surrounded by void volume as shown.

The porous particles can comprise porous materials as described herein. In one embodiment, the porous particles comprise a single porous material although other layers, coatings, and compounds may be present within or on the porous particles; e.g., electrolytes, solid support layers, solid-electrolyte interphase layers, etc. In another embodiment, the porous particles can comprise multi-layered carbon-silicon with a carbon core.

Generally, the structural material functions to stabilize the electrode during use, e.g., during cycling in a rechargeable battery. As shown in FIG. 2, the structural material encapsulates the porous particles while still allowing for expansion thereby stabilizing the electrode during use. The density, dimensions, and size of the particles in the structural material may vary according to the specific materials used, purpose for the electrode, degree of reinforcement required, degree of expansion expected, or other desired results to be achieved. In one embodiment, the particles can be disk shaped. In another embodiment, the porous particles can have a thickness and have at least one dimension selected from length, width, or radius that is twice (2×) the thickness. In one aspect, the thickness of the particles can range from 50 nm to 100 μm. In another aspect, the particles can have a volume ranging from 0.001 $\mu m^3$ to 100 $mm^3$. In still another aspect, the density of the particles in the structural material can range from 1 per $mm^3$ to 1 per 100 $\mu m^3$. The porosity of the particles in the structural material can range from 25% to 80%. In yet another aspect, the volume of the disks may account for less than 50% of the total electrode volume. Additionally, the particles may be embedded to the point that the structural material fully encapsulates each particle. In other aspects, particles may be only partially encapsulated.

Returning again to FIG. 2, it is to be noted that the spacing between porous particles shown in the support material matrix is merely exemplary and no limitation is intended thereby. The spacing between porous particles can be selected in order to attain a specific level of charge, efficiency, or other desired result. As further noted below, the matrix of support material may merely be a coating or encapsulation on the porous particles. In some embodiments, such coatings or encapsulations may be thickened to a desired degree in order to create the support material matrix when the particles are assembled together.

The electrode can be manufactured from various porous materials as known in the art. In one embodiment, the electrode can be manufactured from porous silicon. Other materials that may be especially well-suited for electrode and energy storage devices according to embodiments of the disclosure are porous germanium, porous tin, and titanium dioxide. Possible advantages of using porous silicon include its compatibility with existing silicon technology, inexpensive raw material, and high storage capacity. Porous germanium enjoys similar advantages as a result of existing technology for that material, high storage capacity and, as compared to silicon, enjoys the further possible advantage that its native oxide (germanium oxide) is water-soluble and so is easily removed. (The native oxide that forms on the surface of silicon reduces its conductivity which is an undesirable result) Porous germanium is also highly compatible with silicon technology. However, the raw material cost of germanium is significantly more than silicon. Possible advantages of using porous tin, which is a zero-band-gap material, include its enhanced conductivity with respect to certain other conductive and semiconductive materials and every atom of tin can adsorb four atoms of lithium. Possible advantages of using titanium dioxide include good diffusion of lithium but blocking of electron flow so as to reduce electrochemical side reactions.

Regarding the porous material, the present electrodes can be manufactured to have a target porosity. Such porosity can be achieved using etching techniques, as described herein, or other known techniques as known in the art and can be modified by the amount of void space introduced during encapsulation of the porous disks as discussed herein. The porosity generally allows for the expansion of the porous material during use, e.g., lithiation of porous silicon. In one embodiment, the porosity can be determined based on the designed volume change of the system. For example, if an anode volume change is designed to be x %, then the porosity can be 1-[1/(1+(x %/100%))] or greater. In one example, the porosity can range from 25% to 80%. In one aspect, the porosity can be 50% or more. Other examples of porosity include 60% or more, 70% or more, or even 80% or more.

Other materials may also be used for the porous structure, including silicon carbide, alloys such as an alloy of silicon and germanium, and metals such as copper, aluminum, nickel, calcium, tungsten, molybdenum, and manganese.

Some embodiments may make use of very narrow channels in the porous material. In certain embodiments (to be described in detail below), an electrolyte is introduced into the channels. In such embodiments the size of the channels will be sufficient to allow entry of the electrolyte. Certain electrolytes may have solvated ions on the order of 2 nanometers (nm). In at least one embodiment, therefore, a smallest dimension of each one of the channels is no less than 2 nm so as to permit the electrolyte to flow freely along the entire length of the channels.

In the same or another embodiment, the smallest dimension of each one of the channels is no greater than 1 micrometer (μm). This upper size limit for the smallest dimension of the channels may be chosen for particular embodiments in order to maximize the surface area of the porous structures of those embodiments. In some batteries, the transfer of ions from the electrolyte to the electrode material is the kinetically limiting reaction, and therefore surface area must be maximized to increase power. Smaller (e.g., narrower) channels lead to increased overall surface area for each electrode because a larger number of such narrower channels can fit into an electrode of a given size. Further, the channels' other dimensions, e.g., their lengths and/or shapes, may also be manipulated in order to increase surface area or to achieve some other result. In embodiments where the energy storage device is a battery, the increased surface area provided by the various channel sizes and configurations provides greater opportunity for intercalation of the porous material with an analyte and therefore a greater charge capacity. In other embodiments the smallest dimension of the channels may be larger than 1 μm, and may be up to 10 μm or more. Although larger channels would decrease the surface area of the porous material, such larger channels may provide more interior space in which to grow or expand, or otherwise form additional structures, if needed.

Porous disks according to embodiments of the disclosure can be fabricated with very precise and uniform pore size and porosity control. This allows fast charging and also improves the capacity (pore size may be optimized for fast/efficient diffusion of ions through the pores to maximum amount of surface area).

Referring to FIGS. 3A-3H, the present pores or channels can be formed in various shapes as needed to attain a desired result or advantage. In various embodiments, the pores can be substantially cylindrical (A), offset cylindrical (B), substantially oval (C), tapered (D), include cavities (E), hour glass (F), modified cylindrical (G) or be random (H). Other pore morphology can include various geometrical shapes including substantially rectangular, triangular, conical, elliptical, spherical, or other shapes, or combinations thereof, etc. In some aspects, specific pore shape and size may be utilized in order to accommodate swelling or expansion of the porous material upon intercalation of the lithium or other ionic charge carrier, for example, swelling of silicon upon receipt of lithium.

As discussed herein, the structural material can stabilize the electrode during use. Typically, the structural material allows for the ions present in the electrolyte to diffuse readily through it while providing mechanical support during electrolyte interaction with the porous material (e.g., volume changes such as swelling from lithiation). The structural materials also ensure that electrical conductivity is maintained between the particles and current collector during changes of the porous material. For example, when silicon is used as the anode with lithium, the resulting alloy can have a stoichiometry of up to $Li_{22}Si_5$. This presents a potential volume change in the silicon of between 140% to about 300%. Similarly, when tin is used as the anode with lithium, the resulting alloy can have a stoichiometry of up to $Li_{22}Sn_5$. In some embodiments, the shape of the channels 130 can be selected so as to compensate for or otherwise capitalize on expansion of the porous material.

A variety of material and elements may be suitable for use as the structural material and in certain embodiments, selection of such materials may be made based at least in part on the type of porous material used, the amount of volume change expected upon addition of the lithium or other ion, and the diffusion rates of the ion in the structural material and porous material respectively, and the charge capacity of the structural and porous materials. In one embodiment, the structural material can be a carbon-based material. In one aspect, the carbon-based material can include graphite, graphene, nanotubes, activated carbon, aerogels, and mixtures thereof. In another embodiment the structural material is also active in charge storage and has a charge storage capacity (by volume or weight) of greater than 5%, but less than 50% of the porous material. In still another embodiment, the structural material can include germanium, tin, silicon carbide, titanium dioxide, and mixtures thereof.

The porous particles can further include a solid layer or gel-based polymer electrolyte layer coated on the porous particles. Such layers can improve performance and/or add mechanical strength to the electrodes. The solid layer can include the structural materials described herein. Generally, the solid layer may be applied using processes such as electroplating, chemical vapor deposition (CVD), and/or atomic layer deposition (ALD). For example, titanium dioxide can be deposited into porous silicon by ALD. In another example, the solid layer can be formed by carbonizing the surface of the silicon. In one embodiment, the solid layer can comprise titanium or carbon As discussed herein, in some embodiments, an ion containing electrolyte can be present. A typical, though not the only, type of electrolyte that may be used in accordance with embodiments of the disclosure is an ionic solution. In one embodiment, the electrolyte can be an organic electrolyte. As one example, the electrolyte can be a liquid, gel, or solid solution of organic materials such as lithium hexaflurophosphate in diethyl carbonate, or tetraethylammonium tetrafluoroborate in acetonitrile. Other examples include solutions based on boric acid, sodium borate, or weak organic acids. Generally, the electrolyte is a mixture of organic carbonates such as ethylene carbonate or diethyl carbonate containing complexes of lithium ions. As such, in one example, the electrolyte can comprise a lithium salt. These non-aqueous electrolytes generally use non-coordinating anion salts such as lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), and lithium triflate ($LiCF_3SO_3$). In one aspect, the electrolyte can a 1 molar solution of $LiPF_6$, a 1 molar solution of $LiClO_4$ in propylene carbonate, or a 1 molar solution of $LiPF_6$ in ethylene carbonate and dimethyl carbonate.

Figure 4:
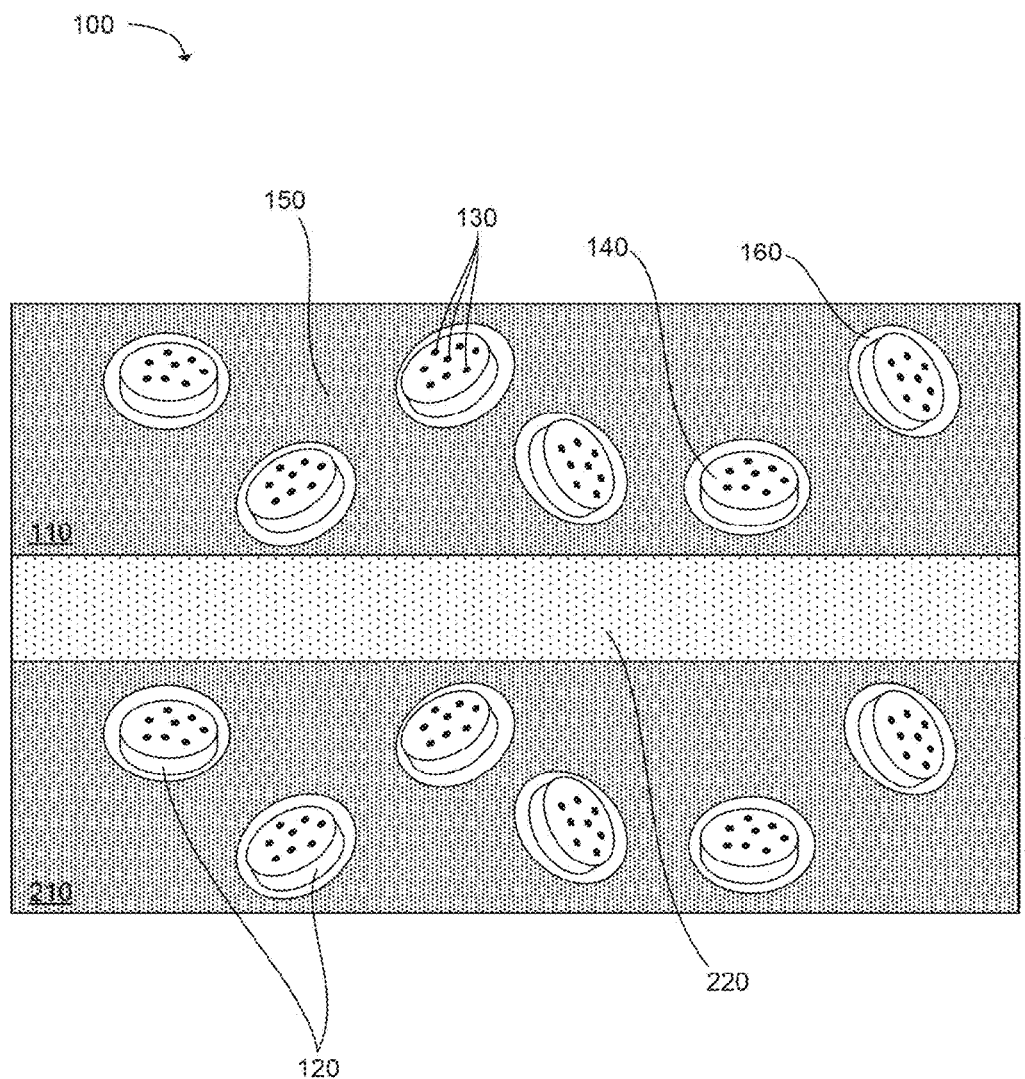
FIG. 4 is cross-sectional view of an energy storage device in accordance with additional embodiments of the invention.

Referring to FIG. 4, an energy storage device 100 can comprise a first electrode 110 and a second electrode 210 separated from each other by a separator. This separator could take any of various forms. For example, in one embodiment, the separator separating the first electrode 110 from the second electrode 210 comprises a polymer membrane. It is to be noted that in some embodiments the second electrode can specifically be a cathode, for example as noted in FIG. 1, and can have the characteristics or configurations mentioned herein for cathodes.

Referring again to FIG. 4, at least one of first or second electrodes 110 and 210 comprises a porous structure containing porous particles 120 where each particle has a plurality of channels 130 opening to the surface 140 of the porous particle. The porous particles are embedded in a structural material 150. In the illustrated embodiment, both first electrode 110 and second electrode 120 comprise such a porous structure. In an embodiment where only one of electrodes 110 and 120 comprises porous particles embedded in a structural material, the other electrode can be, for example, a typical lithium-ion cathode comprised of LiCoO (or other Li-metal-oxide/fluoride/phosphide/etc.) material or particles held together by a binding materials. For example, the cathode can be of any standard cathode material or configuration currently known, including non-porous or non-particulate materials. Specific materials for the cathode are shown in FIG. 1.

Various configurations of energy storage device 100 are possible. In the embodiment of FIG. 4, for example, energy storage device 100 comprises two distinct porous structures (first electrode 110 and second electrode 210) that have been bonded together face-to-face with a separator 220. As another example (not shown), an energy storage device can comprise a single planar porous structure in which a first section (first electrode 110) is separated from a second section (second electrode 210) by a trench containing a separator.

It should be noted that the FIG. 4 depiction of the porous particles as disks is highly idealized in that, to mention just one example, all of the disks appear to be of the same size with the same amount of porous channels opening to the surface of the disk. However, such channels can vary as well as the size, shape, and other morphology of the particles. In some aspects, the particles can be randomly shaped and/or sized. In other aspects, the particles can be uniformly or substantially uniformly shaped and or sized. In other aspects, particles of differing shape and/or size may be included. In an additional embodiment, the particles can be flattened or elongated in shape. In some aspects, the particles may have one directional dimension that is greater than a second directional dimension. In yet a further aspect, the particles may be disk shaped.

The disclosed energy storage devices can generally comprise at least two electrodes, a first and a second electrode. Some embodiments include at least an anode having the features discussed herein, but may also have a cathode with such characteristics.

The present energy storage devices can achieve high capacities by using alloys having specific capacities over 1000 mA h/g, 2000 mA h/g, 3000 mA h/g, or even 4000 mA h/g. For example, as mentioned previously, silicon can alloy with lithium up to a stoichiometry of $Li_{22}Si_5$ providing a maximum theoretical specific capacity of 4200 mA h/g. As discussed herein, to overcome stability issues (e.g. disintegration during cycling), the porous disks, for example silicon, can be embedded in or otherwise encapsulated or coated by, a structural material, e.g. carbon. In some aspects, the embedding can occur either prior or subsequent to addition of the electrolyte (e.g. containing lithium). The pairing of the electrolyte, structural material, and the porous material generally conforms to the relationship where the ion (e.g. lithium) has a higher diffusion rate, but low capacity, in the structural material than in the porous material. For example, when the porous material is porous silicon, the lithium can diffuse faster in the structural material and having a higher diffusion coefficient than $10^{-10}$ $cm^2/s$ for lithium in silicon. In one embodiment, the higher diffusion rate in the structural material can be several orders of magnitude higher than the diffusion rate in the porous material, (e.g. silicon). In an additional embodiment, when carbon is paired with porous silicon particles and lithium ions are active the specific charge storage capacity of the structural material may be only 10% of the porous particles.

While the present structural material can act as a solid-electrolyte interphase (SEI) layer in addition to providing structural support of the electrode, in some embodiments, the present electrodes can comprise a separate solid layer between the surface of the porous material and the structural material. Such layers can include titanium, titanium alloys, or carbon as discussed herein. These materials may be only one component of such layer, or can be the entire layer. As such, these layers may comprise, consist essentially of, or consist of such materials. In one example, the solid layer can be formed by carbonizing the surface of the porous material. For example, a layer of SiC can be formed. In one embodiment, such layer can be formed by gas phase treatment of the porous silicon material and give it a highly stable surface. In other embodiments the structural support material reacts with the electrolyte to form a stable SEI layer.

Figure 5:
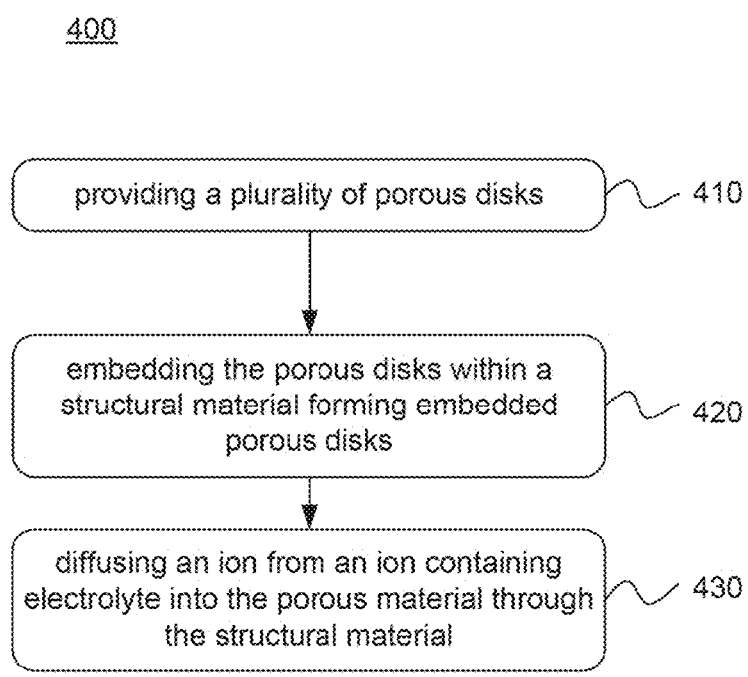
FIG. 5 is a flowchart illustrating a method of manufacturing an energy storage device in accordance with an embodiment of the invention.

Turning now to FIG. 5 is shown a flowchart illustrating an exemplary method of manufacturing an energy storage device or an electrode that can be used in an energy storage device. Specifically, method 400 can include providing a plurality of porous particles (e.g. disks) 410, embedding, coating, or encapsulating the porous disks within a structural material forming embedded, coated, or encapsulated porous disks 420, and diffusing an ion from an ion containing electrolyte into the porous material through the structural material 430. Additionally, a method of stabilizing an electrode for use in an energy storage device can include providing a plurality of porous disks 410 and embedding, coating, or otherwise storing, the porous disks within a structural material forming embedded porous disks 420.

In one embodiment, the present methods can include forming the porous disks by increasing porosity in discrete layers of a block of the porous material and subsequently breaking the discrete layers to form individual porous disks. In another embodiment, the present methods can include coating the porous disks with amorphous silicon where the ion only diffuses through the structural material into the amorphous silicon. In still another embodiment, the present methods can include controlling at least one of the providing, diffusing, or embedding, as discussed herein, to provide a target porosity, wherein the target porosity allows for expansion of the porous material during diffusion of the electrolyte. In some embodiments, the combination of porosity of the porous material and the porosity of the structural material (i.e. interstitial or other void spaces or volume in the structural material) can be controlled and utilized to accommodate expansion of the porous material upon intercalation of the ions such as lithium into silicon.

As discussed herein, in some embodiments, the ion can have a higher diffusion rate within the structural material than within the porous material. This allows the ion to diffuse through the structural material to the porous material while the structural support stabilizes the porous material. Notably, the structural support would be placed under compressive stress during expansion of the porous material during use resulting in a stronger electrode. As discussed herein, such a structural support can provide stability to the electrode resulting in a longer working life. The present embodiments can further include controlling the charge state of the electrode to minimize or prevent disintegration of the electrode during use. In one aspect, the charge state can be controlled such that the volume of the porous material does not change more than 200%. In another embodiment, the methods can further comprise controlling the pore size of the porous disks such that the openings of the channels close upon expansion of the porous material thereby preventing overcharging.

In one embodiment, porous particles can be embedded in the structural material by mixing a plurality of porous particles with the structure material and a liquid to form a slurry. The slurry can be coated onto a current collector using a method such as spin casting, drop casting, doctor blade, etc., and baked to remove any remaining liquid. In another embodiment, porous particles may be mixed with a polymer and the polymer mixture can be coated onto a current collector using one of the above-mentioned processes. In some aspects, the polymer may be pyrolized to improve mechanical stability and conductivity. In still another embodiment, porous particles can be coated with a structural material using a deposition technique, such as CVD or ALD. The coatings may be thickened until the voids between the particles are substantially filled.

In other aspects, the porous particles can be coated with a structural material. The coating may be initiated by carbonization of the porous particles or by coating with a suitable adhesion promoter, for example, using ALD or other functionalizing techniques. The coated particles may then be embedded in a support material matrix. In one embodiment, creating of the matrix may occur by merely thickening the layers on the particles to a desired thickness and then combining the particles through an agglomeration or aggregation process, which in some aspects can cause the coated particles to further grow together in a mass by the additional deposition of support materials to fill interstitial or void spaces. Again, the void volume maintained can be selected to achieve a desired result, such as accommodation of porous material expansion upon electrolyte addition. In one aspect, a CVD, ALD, or slurry based processes can be controlled so it can fill the large voids between particles without filling the small pores in the particles.

With respect to the particles of porous material, in some embodiments, such particles may consist of a substantially single material, for example, silicon, and in other embodiments, the particles may comprise multiple materials. By way of example, in one embodiment, carbon cores can be formed and coated with silicon. The silicon can be etched to create a porous material. The porous material now includes a core of structural material, which in this case is carbon. The surface of the porous particle can then be coated, functionalized, or otherwise treated, when desirable, and then embedded or encapsulated with structural material. In some embodiments, successive layers of porous material and structural material may be used, for example, to create a core-shell type structure that is then embedded or encapsulated with the structural material.

Figures 6A, 6B:
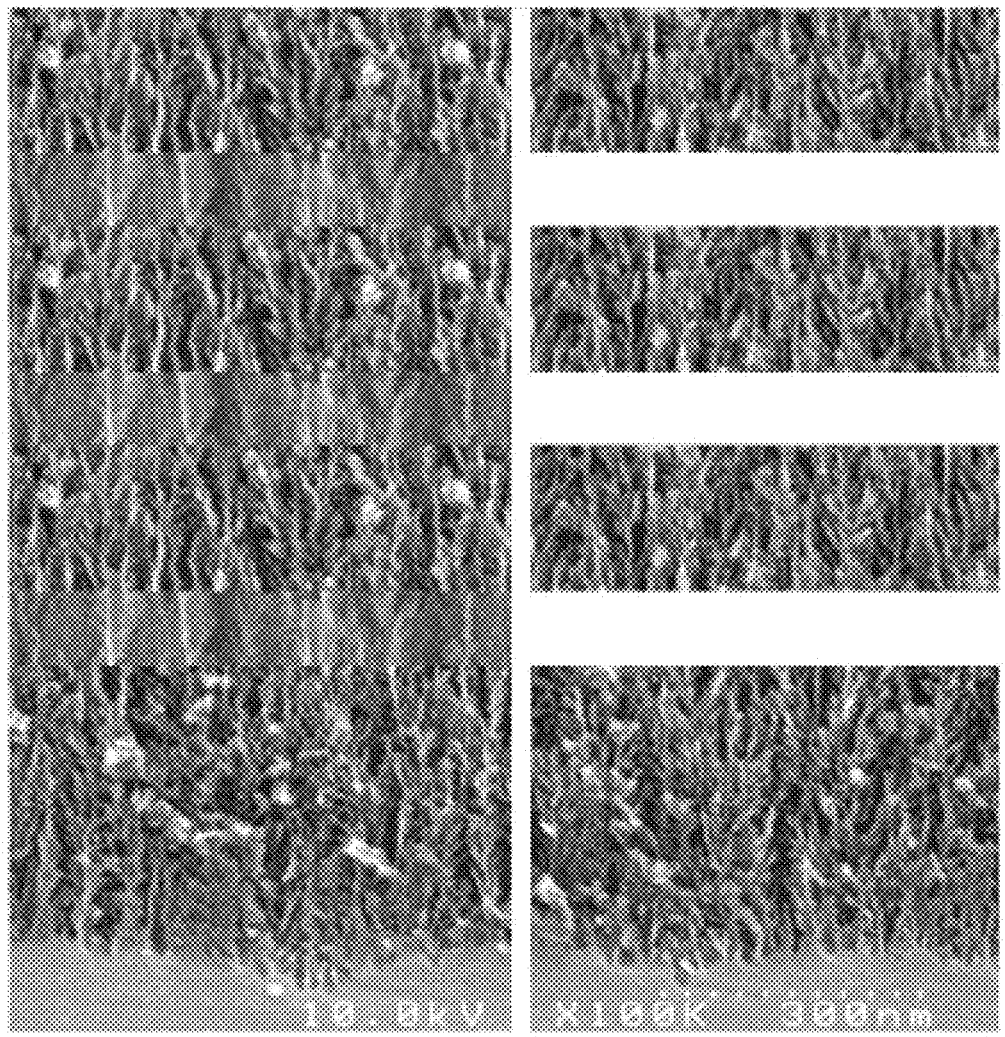
FIGS. 6A-B are scanning electron microscope (SEM) images of porous silicon (A) cross section with weakened layers (high porosity) and (B) after removal of the weakened layers to provide porous silicon disks in accordance with embodiments of the invention.
Figure 6C:
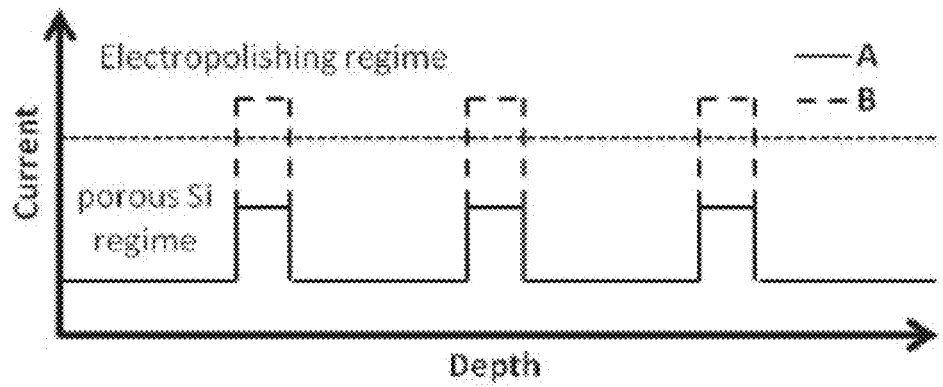
FIG. 6C is a plot of current density vs. etch depth to provide porous silicon disks separated by weakened (high porosity) layers according to certain invention embodiments.

Regarding FIG. 6, a method of making the porous particles e.g. disks can include introducing weakened layers of high porosity to be mechanically broken after anodization (FIG. 6A) or by electropolishing a thin layer of silicon between each disk (FIG. 6B). An electropolishing regime is shown in FIG. 6C.

Regarding creating the porous material, such porous material can be made by etching a material using an etchant, for example an acid solution, to provide a porous material having a plurality of channels or pores opening to a surface of the porous material. In one aspect, the etchant can be hydrofluoric acid and an alcohol. The disks can be embedded in a structural material or can first be coated with a solid layer as discussed herein.

In further exemplary detail, the porous material of the electrode or electrodes of an energy storage device can be created by a wet etch process in which a liquid etchant applied to a surface of the electrode etches away portions of the electrode in a way that it at least somewhat similar to the way water is able to carve channels in rock. This is why each one of the channels has an opening to the surface of the electrode.

With the right etchant, it is be possible to make porous structures having the described characteristics from many materials, resulting in conductive, semiconductive, and insulating materials. As an example, a porous silicon structure may be created by etching a silicon substrate with a mixture of hydrofluoric acid and ethanol. More generally, porous silicon and other porous structures may be formed by such processes as anodization and stain etching.

After etching, as discussed herein, the porous disks can be embedded within a structural material. Additionally, some embodiments of the present methods can include depositing a first portion of the electrolyte on the surface prior to depositing the structural material. Further, some embodiments can include removing a non-etched portion of the porous material to form a second surface, with channels opening to the second surface. Regarding porosity, embodiments of the present methods can include controlling at least one of the depositing, current, etching mixture, material doping, or diffusing to provide a target porosity, e.g. 50% or more. Generally, as discussed herein, the target porosity can allow or be designed to compensate for expansion of the porous material during diffusion of the ion from the electrolyte.

Specific embodiments of the present electrodes can be used in the manufacture of an energy storage device, e.g., a rechargeable battery. As such, in one embodiment, the present electrodes can be preloaded with a material such as lithium that can act as an ionic charge carrier prior to assembly. Additionally, the present methods can include electrically connecting the first electrode to an electrical load and a second electrode to an electrical load, wherein the first electrode is an anode and the second electrode is a cathode. In another embodiment, the method can include electrically connecting the first electrode to a first potential having a first polarity and electrically connecting the second electrode to a second potential having a second polarity that is opposite the first polarity.

In one example, an electrode for use in an energy storage device can comprise porous disks comprising a porous material, the porous disks having a plurality of channels and a surface, the plurality of channels opening to the surface; and a structural material encapsulating the porous disks; where the structural material provides structural stability to the electrode during use.

In one example, an energy storage device can comprise a first electrode comprising porous particles e.g. disks and an ion containing electrolyte, the porous disks embedded in a structural material, the porous disks comprising a porous material and having plurality of channels and a surface, the plurality of channels opening to the surface; where the ion from the ion containing electrolyte has a higher diffusion rate in the structural material than in the porous material.

In one example, the porous disks can have a thickness and have at least one dimension selected from length, width, or radius that is twice (2×) the thickness.

In one example, the electrode or energy storage device can further comprise an ion containing electrolyte, wherein the ion has a higher diffusion rate in the structural material than in the porous material.

In one example, the higher diffusion rate in the structural material can be an order of magnitude higher than the diffusion rate in the porous material.

In one example, the ion containing electrolyte can comprise a lithium salt including lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), lithium triflate ($LiCF_3SO_3$), or mixtures thereof.

In one example, the ion containing electrolyte can be 1 molar solution of $LiPF_6$, 1 molar solution of $LiClO_4$ in propylene carbonate, or a 1 molar solution of $LiPF_6$ in ethylene carbonate and dimethyl carbonate.

In one example, The energy storage device of claim 1, wherein the porous particles have a porosity ranging from about 25% to about 80%.

In one example, the structural material can be a carbon-based material.

In one example, the carbon-based material can be selected from the group consisting of graphite, graphene, nanotubes, activated carbon, aerogels, and mixtures thereof.

In one example, the structural material can be selected from the group consisting of germanium, tin, silicon carbide, titanium dioxide, and mixtures thereof.

In one example, the porous material can be selected from the group of silicon, tin, and titanium dioxide.

In one example, the porous material can be silicon.

In one example, the porous disks can comprise multi-layered carbon-silicon with a carbon core.

In one example, the electrode or energy storage device can further comprise a solid layer coated on the porous disks.

In one example, the electrode can have a porosity ranging from about 30% to about 80%.

In one example, the higher diffusion rate in the structural material can be an order of magnitude higher than the diffusion rate in the porous material.

In one example, the energy storage device can further comprise a second electrode wherein the first electrode is an anode and the second electrode is a cathode.

In one example, a method of manufacturing an energy storage device can comprise providing a plurality of porous disks, the porous disks comprising a porous material, the porous material having a plurality of channels opening to a surface of the porous material; embedding the porous disks within a structural material forming embedded porous disks; diffusing an ion from an ion containing electrolyte into the porous material through the structural material; where the embedded porous disks form a first electrode and wherein the ion has a higher diffusion rate in the structural material than in the porous material.

In one example, a method of stabilizing an electrode for use in an energy storage device can comprise providing a plurality of porous disks, the porous disks comprising a porous material, the porous material having a plurality of channels opening to a surface of the porous material; embedding the porous disks within a structural material forming embedded porous disks; where the embedded porous disks form a stable electrode.

In one example, the method can further comprise etching a material using an acidic solution to provide the porous material.

In one example, the acidic solution can comprise hydrofluoric acid and an alcohol.

In one example, the method can further comprise electrically connecting the first electrode to an electrical load and a second electrode to an electrical load, wherein the first electrode is an anode.

In one example, the method can further comprise forming a solid layer on the surface of the porous material.

In one example, forming can include carbonizing the surface.

In one example, the solid layer can include titanium or carbon.

In one example, providing can include forming the porous disks by increasing porosity in discrete layers of a block of the porous material and subsequently breaking the discrete layers to form individual porous disks.

In one example, the porous disks can be coated with amorphous silicon and wherein the ion from an ion containing electrolyte only diffuses through the structural material into the amorphous silicon.

In one example, the method can further comprise controlling at least one of the providing, diffusing, or embedding to provide a target porosity, wherein the target porosity allows for expansion of the porous material during diffusion of the ion from the ion containing electrolyte.

In one example, the method can further comprise controlling the pore size of the porous disks such that the openings of the channels close upon expansion of the porous material thereby preventing overcharging.

In one example, the method can further comprise controlling the charge state such that the volume of the porous material does not change more than 200%.

The described features, structures, or characteristics may be combined in any suitable manner in one or more embodiments. In this description, numerous specific details are provided, such as examples of layouts, distances, network examples, etc. One skilled in the relevant art will recognize, however, that many variations are possible without one or more of the specific details, or with other methods, components, layouts, measurements, etc. In other instances, well-known structures, materials, or operations are not shown or described in detail but are considered well within the scope of the disclosure.

While the forgoing examples are illustrative of the specific embodiments in one or more particular applications, it will be apparent to those of ordinary skill in the art that numerous modifications in form, usage and details of implementation can be made without departing from the principles and concepts articulated herein. Accordingly, no limitation is intended except as by the claims set forth below.

What is claimed is:

1. An electrode comprising:
    porous disks comprising a porous material, the porous disks having a surface with a plurality of channels opening to the surface; and
    a structural material encapsulating the porous disks;
    wherein the electrode does not include a polymer mixed with the porous disks.

2. The electrode of claim 1, wherein the porous disks have a thickness and have at least one dimension selected from length, width, or radius that is twice (2×) the thickness.

3. The electrode of claim 1, further comprising an ion containing electrolyte, wherein the ion has a higher diffusion rate in the structural material than in the porous material.

4. The electrode of claim 3, wherein the higher diffusion rate in the structural material is an order of magnitude higher than the diffusion rate in the porous material.

5. The electrode of claim 3, wherein the ion containing electrolyte comprises a lithium salt including lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), lithium triflate ($LiCF_3SO_3$), or mixtures thereof.

6. The electrode of claim 1, wherein the structural materials have a specific charge storage capacity of from about 5% to about 50% of the specific capacity of the porous particles.

7. The electrode of claim 1, wherein the structural material is a carbon-based material.

8. The electrode of claim 7, wherein the carbon-based material is selected from the group consisting of graphite, graphene, nanotubes, activated carbon, aerogels, and mixtures thereof.

9. The electrode of claim 1, wherein the structural material is selected from the group consisting of germanium, tin, silicon carbide, titanium dioxide, and mixtures thereof.

10. The electrode of claim 1, wherein the porous material is selected from the group of silicon, tin, germanium, SiGe, Si alloys, and titanium dioxide.

11. The electrode of claim 1, wherein the porous material is silicon.

12. The electrode of claim 1, wherein the porous disks comprise multi-layered carbon-silicon with a carbon core.

13. The electrode of claim 1, further comprising a solid layer coated on the porous disks.

14. The electrode of claim 1, wherein the porous particles have a porosity ranging from about 25% to about 80%.

15. An energy storage device comprising:
a first electrode comprising porous disks and an ion containing electrolyte, the porous disks embedded in a structural material, the porous disks comprising a porous material and having a surface with a plurality of channels opening to the surface;
wherein the electrode does not include a polymer mixed with the porous particles; and
wherein the ion has a higher diffusion rate in the structural material than in the porous material.

16. The energy storage device of claim 15, wherein the porous material is silicon.

17. The energy storage device of claim 15, wherein the structural material is a carbon-based material selected from the group consisting of graphite, graphene, nanotubes, activated carbon, aerogels, and mixtures thereof.

18. The energy storage device of claim 15, further comprising a second electrode wherein the first electrode is an anode.

19. A method of manufacturing an energy storage device, comprising:
providing a plurality of porous disks, the porous disks comprising a porous material, the porous material having a plurality of channels opening to a surface of the porous material, wherein the porous disks are provided by increasing porosity in discrete layers of a block of the porous material and subsequently breaking the discrete layers to form individual porous disks or by electropolishing discrete layers of the block of the porous material between each disk;
embedding the porous disks within a structural material forming embedded porous disks;
diffusing an ion from an ion containing electrolyte into the porous material through the structural material;
wherein the embedded porous disks and a structural material form a first electrode and wherein the ion has a higher diffusion rate in the structural material than in the porous material.

20. The method of claim 19, further comprising etching a material using an acidic solution to provide the porous material.

21. The method of claim 19, wherein the porous material is selected from the group consisting of silicon, tin, germanium, SiGe, Si alloys, titanium dioxide, and mixtures thereof; and
the structural material is selected from the group consisting of carbon, germanium, tin, silicon carbide, titanium oxide, and mixtures thereof.

22. The method of claim 19, further comprising forming a solid layer on the surface of the porous material.

23. The method of claim 19, wherein providing includes forming the porous disks by increasing porosity in discrete layers of a block of the porous material and subsequently breaking the discrete layers to form individual porous disks.

24. The electrode of claim 1, wherein the porous disks are formed by increasing porosity in discrete layers of a block of the porous material and subsequently breaking the discrete layers to form individual porous disks or by electropolishing discrete layers of the block of the porous material between each disk.

25. The electrode of claim 1, wherein the porous disks have a substantially uniform shape and size.

26. The electrode of claim 1, wherein every channel in the porous disks opens to the surface.

27. The electrode of claim 1, wherein some of the porous particles are entirely or partially surrounded by a void space in the structural material.

* * * * *